United States Patent [19]

Chambers

[11] 4,218,729

[45] Aug. 19, 1980

[54] POLYPHASE RECTIFYING BRIDGE WITH COMMUTATION FAULT PROTECTION

[75] Inventor: George S. Chambers, Daleville, Va.

[73] Assignee: General Electric Company, Salem, Va.

[21] Appl. No.: 970,429

[22] Filed: Dec. 18, 1978

[51] Int. Cl.² .............................................. H02H 7/125
[52] U.S. Cl. ........................................ 363/54; 363/87; 363/129
[58] Field of Search ..................................... 363/51–54, 363/85–88, 128–129; 318/345 C, 434, 506

[56] References Cited

U.S. PATENT DOCUMENTS

| | | | |
|---|---|---|---|
| 3,701,938 | 10/1972 | Chadwick | 363/51 |
| 4,016,468 | 4/1977 | Graf | 363/129 X |
| 4,028,607 | 6/1977 | Watanabe | 363/51 |

*Primary Examiner*—J. D. Miller
*Assistant Examiner*—Peter S. Wong
*Attorney, Agent, or Firm*—Arnold E. Renner

[57] ABSTRACT

In association with a polyphase rectifying bridge having controlled rectifiers there is employed, in addition to the normal means for controlling the firing time of the controlled rectifiers, additional circuitry for preventing the occurrence of a commutation fault. This is achieved by first producing a timing signal representative of the time intervals during which a commutation between successively fired controlled rectifiers of the bridge actually exist. This timing signal, after being properly shaped is combined with a basic reference signal representative of a predetermined value to which the rectifiers may be phased back in their firing angle without resulting in a commutation failure. Stated in another way, the width of the existing commutation period serves to set a minimum to which the next commutation period must conform. When the prescribed relationships exist between the timing signal and the basic reference signal, the normal control means is overriden and the firing angle of the controlled rectifier is advanced to a point which will insure commutation.

11 Claims, 3 Drawing Figures

POLYPHASE RECTIFYING BRIDGE WITH COMMUTATION FAULT PROTECTION

BACKGROUND OF THE INVENTION

The present invention relates generally to the operation of rectifier bridges and more specifically to a scheme for the prevention of or guarding against commutation faults, particularly those which are occasioned by a too rapid retardation in the normal firing angle of the controlled rectifiers.

In any polyphase rectifier system, each phase carries all the current for a portion of the time. For example, in a three phase circuit each phase carries all the current for one-third of the time. With diodes, transfer or commutation from phase to phase is automatically achieved by the next phase having a greater instantaneous voltage than the phase which is then carrying current. When controlled rectifiers, such as thyristors (e.g., silicon controlled rectifiers) are used, however, the load voltage may be controlled by delaying the transfer of current between the phases. This is commonly known as phase control. While phase control is a very effective method of controlling the load voltage, care must be taken in order that the voltage-time relationships are sufficient to allow commutation or transfer of the current and so that a commutation failure resulting in an undesirable condition does not occur.

When the alternating current (a.c.) source supplying the rectifier bridge has significant inductance, the transfer of the current or the commutation from phase to phase takes both voltage and time. There must be sufficient volt-seconds available to force the current off in one phase and to bring it up in the next phase. For any particular source, the volt-seconds required are a function of the current to be commutated and not the point at which transfer is initiated. A typical system may require, for example, 45 electrical degrees to achieve commutation at full phase conduction. When the rectifiers are driving a highly inductive load, such as a generator field having a time constant measured in seconds, the current to be transferred immediately following a sudden required output voltage reduction is the same as it was immediately prior thereto and the volt-seconds required for commutation are the same. If the initiation of transfer is delayed too long by the controlled rectifiers, the remaining volt-seconds available may be insufficient to complete the transfer and a commutation failure will result. Similarly, when the bridge is used to drive a highly inductive load such as a motor, if the demand on the motor is suddenly reduced such that the normal control governing the firing of the rectifiers is phased back or retarded very rapidly, the same situation concerning the available volt-seconds and the current can exist. As the load current decreases in response to the lower voltage requirement, less volt-seconds are required to complete the current transfer and the firing of the rectifiers to initiate current transfer, may be further delayed without resulting in an improper operation.

One early method of operation of the bridges to insure proper commutation was to place what is commonly known as a free-wheeling diode across or in parallel with the load. This was a satisfactory solution for the technology of the past since the semiconductors then used could not be operated at high current densities for thermal reasons. As such, the forward voltage drop at maximum permissible current was close enough to the voltage drop at the current level at which a controlled rectifier would gain control that a diode placed in parallel with the two series connected cells of the bridge would divert the load current and allow the controlled rectifier of the bridge to retain control. With modern semiconductors, operation at a much higher current density is quite common and this is no longer true. In the present situation, if the bridge having a free-wheeling diode is suddenly phased back from full rated current to some very low desired value, the freewheeling diode will have too large a forward voltage drop to divert all of the current and the current will divide between the free-wheeling path and the bridge path such that the current through the bridge path will be more than enough to keep the controlled rectifier (the bridge path) conductive. Thus, a commutation failure will result.

SUMMARY OF THE INVENTION

It is, therefore, an object of the present invention to provide an improved polyphase rectifier bridge system.

It is another object to provide an improved circuit for use with a polyphase rectifying bridge for the prevention of or guarding against a commutation failure.

It is a further object of the invention to provide, in a polyphase rectifying bridge system, suitable circuitry to guard against the occurrence of commutation faults particularly those caused by too rapid a reduction in the required controlled rectifier firing angle.

It is a still further object to provide, in a polyphase rectifying bridge system, circuitry to guard against the occurrence of commutation faults by limiting the minimum firing angle as a function of the time duration of immediately past occurring commutation times.

The foregoing and other objects are satisfied in accordance with the present invention through suitable circuitry which recognizes the fact that, in a highly inductive system, the time required for successive commutations cannot be reduced significantly from one to the other since there will not be that rapid a reduction in the current which must be commutated. As such, the present invention includes, in association with a polyphase rectifying bridge having controlled rectifiers and the normal means for controlling the firing time or firing angle of the rectifiers, additional circuitry for preventing the occurrence of a commutation fault. This circuitry includes means to sense the phase-to-phase voltages of the a.c. source at the point at which it supplies the bridge and to provide, in response to this sensing, a series of pulses which by their width represent the commutation time of the bridge rectifiers. The pulses are averaged to produce an analog output signal having a magnitude representative of the commutation times and this analog signal is combined with a basic reference signal representing a minimum time period during which commutation should exist in order to prevent commutation failure. When the relationship exceeds a predetermined bound, the normal control signal is overridden and the firing angle of the controlled rectifiers is advanced over what would be demanded by the normal control signal to thus prevent a commutation failure.

BRIEF DESCRIPTION OF THE DRAWING

While the present invention is particularly defined in the claims annexed to and forming a part of this specification, a better understanding can be had from the following description taken in conjunction with the accompanying drawing in which:

DETAILED DESCRIPTION

Figure 1:
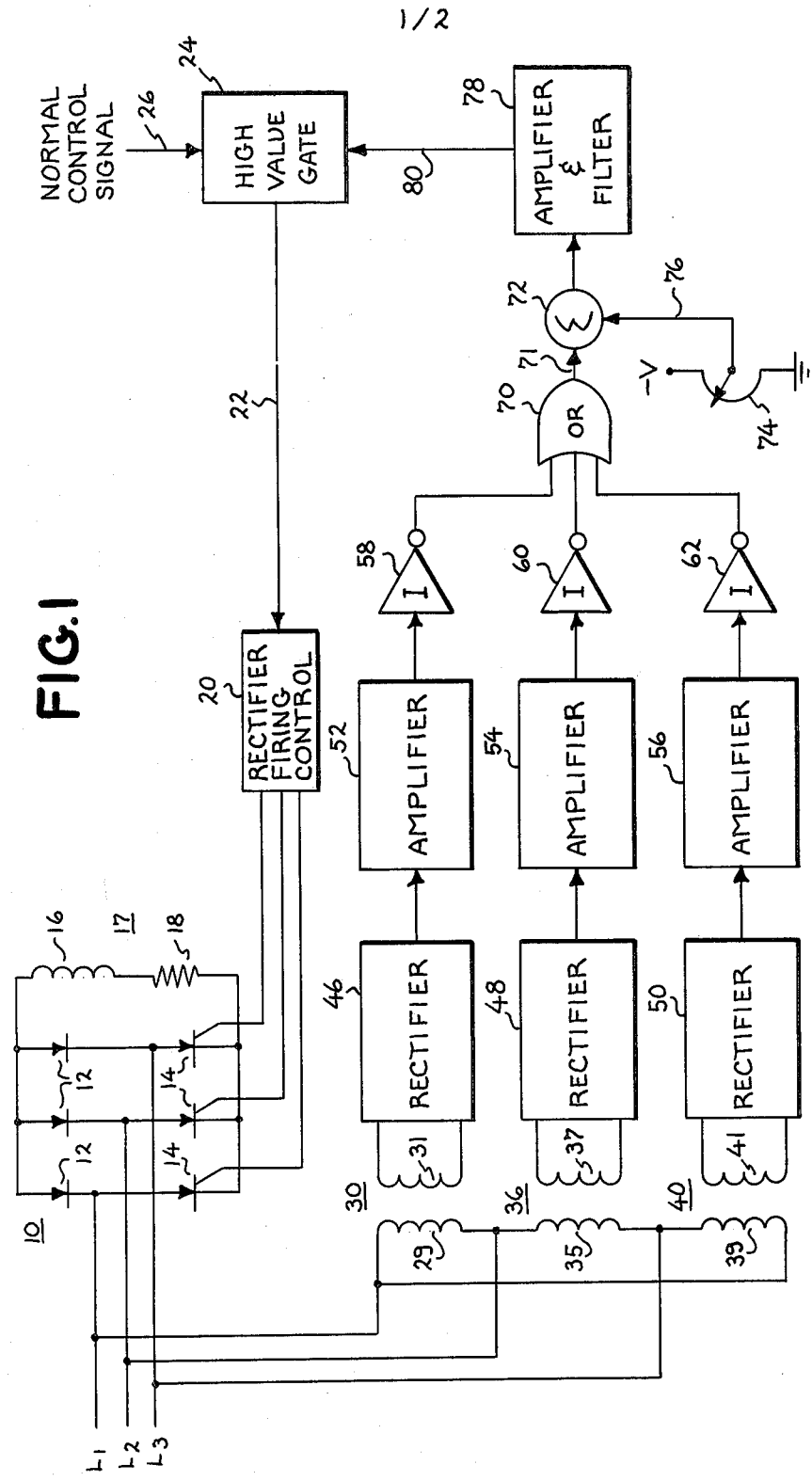
FIG. 1 is a block diagram illustrating the present invention in its preferred embodiment.

Referencing now FIG. 1 which shows the preferred embodiment of the present invention in block form, it is seen that a source of a.c. power, represented by the lines $L_1$, $L_2$ and $L_3$, is connected to a three phase rectifying bridge indicated generally at 10 which is comprised of three diodes 12 and three controlled rectifiers 14 (e.g., silicon controlled rectifiers). It should be specifically noted that while a hybrid bridge of diodes and controlled rectifiers is shown, the present invention is applicable to any standard three phase bridge such as one including all controlled rectifiers. Bridge 10 is connected to supply d.c. power to a load indicated generally at 17 which in the present instance is shown as comprised of an inductance 16 and a resistor 18. Such a load might be the field winding of a generator or motor. Bridge 10 is operated in a phase controlled mode as is well known in the art and, as such, the gate electrodes of the three controlled rectifiers 14 are connected to a rectifier firing control circuit 20 which may be any of those well known in the art. In one of the most common forms, the signal on line 22 is an analog voltage signal and the gate pulses supplied by the rectifier firing control 20 to the rectifiers 14 occur in a time relationship with respect to the a.c. voltage, as a function of the magnitude of the signal on line 22, to thus control the power supplied to the load 17.

Line 22 is the output line of a high value gate 24 which has two inputs the first of which is labeled "normal control signal" (line 26). The high value gate may be any of those types well known in the art but in its simplest form is comprised merely of two diodes having their cathodes connected to a common point which point serves as the origin of line 22. The input signals to the respective anodes of the two diodes are the two signals which are intended to be selectively passed. The high value gate will be discussed in greater detail with respect to FIG. 2. The second input to the high value gate is a signal by way of line 80 which will be discussed in detail later in this specification since this signal is the overriding signal resulting from the commutation prevention scheme of the present invention.

The commutation failure prevention feature of the present invention has its origin with signals from what amounts to three single phase transformers 30, 36 and 40. These three transformers are connected, respectively, across the phase-to-phase voltages of the a.c. source. That is, as shown in FIG. 1, transformer 30 has its primary 29 connected across lines $L_1$ and $L_2$ while transformer 36 has its primary winding 35 connected between lines $L_2$ and $L_3$. Primary winding 39 of transformer 40 is connected between lines $L_3$ and $L_1$. Each of the transformers 30, 36 and 40 is provided with a secondary winding 31, 37 and 41, respectively. Each of the secondary windings 31, 37 and 41 is connected, respectively, to a corresponding rectifier circuit 46, 48 or 50. The rectifier units may be standard full wave diode rectification bridges to thereby provide, at their outputs, signals which are rectified versions of the inputs.

As is well known, during the time of commutation, that is, the time during which the current within the bridge 10 is transferring from one controlled rectifier 14 to another, there exists a period of time in which both rectifiers are conducting and thus the voltage between the adjacent a.c. lines is zero or essentially zero. As such, a well-defined time period is available to be sensed by the transformers 30, 36 and 40. Since the transformer secondary voltages are rectified, there is provided at the output of each of the rectifiers 46, 48 and 50 a series of unidirectional signals which represents the periods of time during which commutation is occurring in an associated phase. These pulses are represented by line A of FIG. 3.

Figure 3:
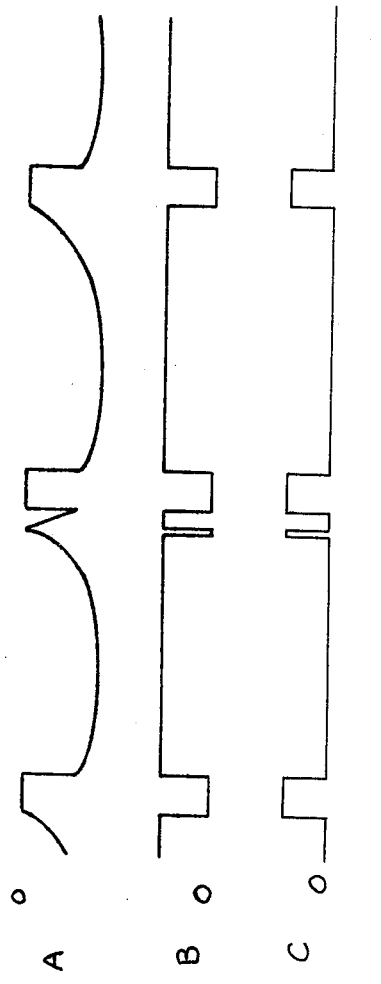

The outputs of the three rectifiers 46, 48 and 50 are connected as inputs, respectively, to three shaping amplifiers 52, 54 and 56 which may be nothing more than high gain amplifiers with clipped outputs to provide at the output of each of the amplifiers a series of square wave pulses as represented by line B of FIG. 3. It is seen that the width of the pulses in line B is essentially the same as the width of the signals derived from the rectifiers but that the waves have been shaped and the polarity inverted.

Each of the amplifiers 52, 54 and 56 outputs a signal which is applied to a respective logic inverter 58, 60 or 62. The outputs of these inverters are the logical inversions of their inputs as is represented by line C of FIG. 3. It is to be understood that in each 360 electrical degrees of each phase of the a.c. source, each of the inverters 58, 60 and 62 will provide two output pulses.

The outputs of the inverters 58, 60 and 62 are applied to an OR gate 70 the output of which (line 71) forms one input to a summing junction 72. A second input to summing junction 72 is via a line 76 and is the output of a reference potentiometer 74 which is shown connected between a source of negative potential ($-V$) and ground. In the preferred embodiment of the present invention, the relative polarities of the two signals applied to the summing junction 72 are opposite and the algebraic sum is thus taken and applied to an amplifier and filter circuit 78 the output of which forms the signal on line 80. As will be more fully understood with respect to the description of FIG. 2, amplifier and filter circuit 78 performs an averaging function with respect to the pulses supplied by OR gate 70 such that there appears on line 80 a signal which is proportional to the difference between the average value of the pulses delivered by way of OR gate 70 and the value of the basic reference signal from the potentiometer 74. The basic reference signal has a value proportional to the minimum commutation time permissible in order to insure against commutation failure.

As earlier indicated, the output of the amplifier and filter circuit 78 is applied by way of line 80 to the high value gate 24 and there will appear on line 22 the higher of the two signals on lines 26 and 80.

From the foregoing description, the operation of the present invention is believed to be apparent. Very briefly, however, under normal operating situations, the value of the signal on line 26 is higher than that on line 80 and the former is, therefore, passed by the gate 24 to serve as the control for the operation of the bridge 10 all in the manner well known in the art. However, if there is a sudden decrease in the value of the signal on line 26 such as would occur if the demands of the load were suddenly decreased, the value of the signal on line 80 would be higher than that on line 26 and that signal would in turn control the operation of the bridge 10. That this is desirable may be understood when it is remembered that a higher current requires a longer commutation time. Thus, if the bridge were operating at a high level (high current) and the normal control signal on line 26 were suddenly to drop as was earlier explained, there may be insufficient volt-seconds in the newly required firing time specified by the normal control signal to effect commutation. This would be recognized by the system of the present invention which senses the commutation time immediately prior to the reduction in demand. This sensing effects the signal which is applied by way of gate 80 to hold the rectifier control at a lesser phased back point of operation to insure the proper volt-seconds for commutation. As the current begins to decrease, the value of the pulses applied to OR gate 70, which are a function of the commutation time, would decrease due to a smaller commutation time and the value of the signal on line 80 would therefore decrease.

Figure 2:
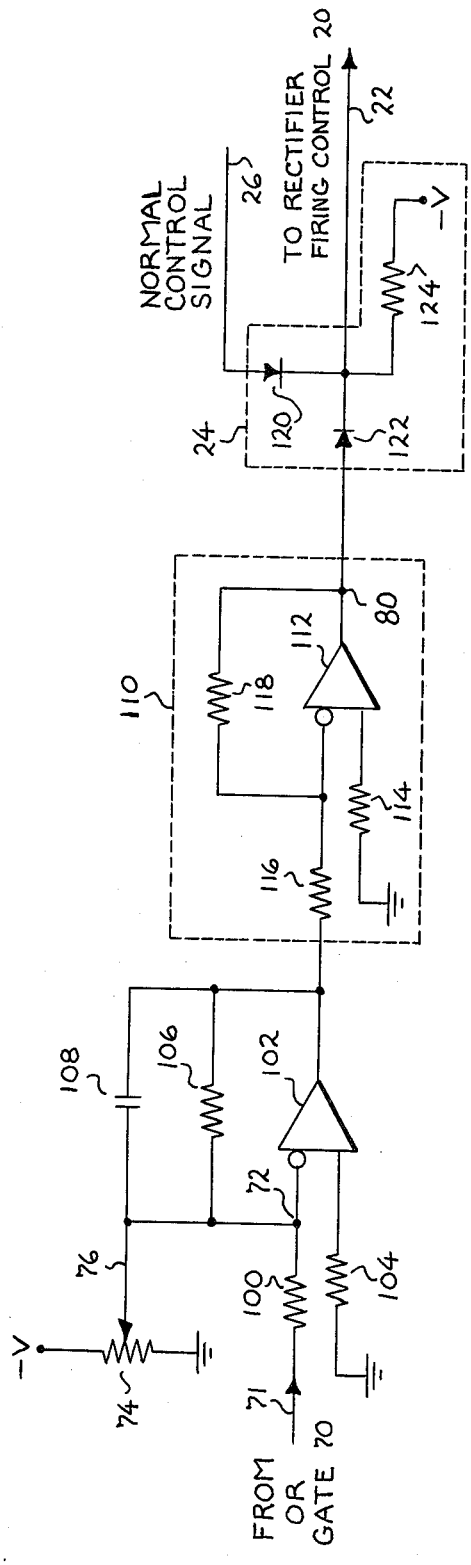
FIG. 2 is a detailed schematic diagram illustrating one portion of the circuitry shown in block form in FIG. 1; and, FIG. 3 is a timing diagram useful in understanding the operation of the present invention.

While none of the individual circuits shown in FIG. 1 is believed to be new and all are believed well known in the art, for purposes of completeness the particular configuration involving the basic reference voltage derived from the potentiometer 74, the summing junction 72, the amplifier and filter circuit 78 and the high value gate 24 are illustrated in FIG. 2. As there shown, the output signal from gate 70 on line 71 is applied by way of an input resistor 100 to the inverting input of an operational amplifier 102 which is connected in the averaging mode. The noninverting input of that amplifier is connected via resistor 104 to ground while the output of the amplifier 102 is connected to its inverting input by way of a parallel combination of a resistor 106 and a capacitor 108. Potentiometer 74 is shown connected to junction 72 by line 76. Junction 72 is, of course, at the inverting input of the amplifier 102. Thus, when the signal from gate 70, shown in FIG. 3, line C, as a positive signal, is of a higher magnitude than the negative reference supplied to junction 72 by way of the reference 74, there will be a negative output of the amplifier 102. Conversely, when the basic reference voltage from potentiometer 74 is of a higher absolute magnitude than the positive signal from gate 70, there will be a positive output from gate 102. Since, with reference to FIG. 1 a high value gate 24 was used and it is desired that the signal on 80 be positive when a large commutation time is in effect, an inverter (block 110) is provided to invert the output of the amplifier 102. This inverter is of the well-known type and may comprise an operational amplifier 112 having its noninverting input connected to ground by a resistor 114. The output of amplifier 102 is applied to the inverting input of amplifier 112 by way of an input resistor 116 and the output of the amplifier 112 is connected to its input by way of a feedback resistor 118 all in a manner well known in the art.

For purposes of completeness, the high value gate 24 is also shown in FIG. 2 as comprising a first diode 120 having applied to its anode the normal control signal on line 26. A second diode 122 receives the output of the operational amplifier 112. The cathodes of the two diodes 120 and 122 from the origin of line 22 and this same point is also connected to a source of negative potential (−V) by way of a suitable resistor 124.

From the foregoing, it is seen that under normal operation the bridge 10 will be under the control of the normal control signal on line 26 but that when commutation failure is eminent by virtue of a sudden drop in that signal, the high value gate will select the signal from line 80, the feedback circuit and this signal will override that on line 26. This higher level signal forces the value of the control signal on line 22 to a higher level than that which would be occasioned by the normal control signal thus maintaining the rectifier firing control at a higher level of operation. As the load current decreases, the signal value on line 80 will decrease and after a short period of time control of the system will be returned to the normal control signal (line 26). The relatively short period during which the bridge is phased to the higher level, for example full on, will have no significant effect on the load particularly when the load is highly inductive as was assumed in the present instance.

From the foregoing, it is seen that there has been provided a relatively simple and easily implemented circuit which prevents or at leasts guards against the commutation failure of the controlled rectifiers of a polyphase rectification bridge. While there has been shown and described what is at present considered to be the preferred embodiment of the present invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. For use with a polyphase rectifying bridge having at least one controlled rectifier associated with each phase and means for phase controlling said rectifiers to thereby control the power supplied from a source of alternating current power to a load connected to the bridge, a circuit for avoiding commutation failure of said rectifiers comprising:
    (a) timing means for determining the time periods during which commutation of each of said rectifiers occurs and to provide an output signal representative thereof;
    (b) means to provide a reference signal representing a predetermined value to which phasing back of said control rectifiers is limited;
    (c) means to combine said output signal and said reference signal to provide an overriding control signal; and,
    (d) means selectively responsive to said overriding control signal to advance the firing angle of the rectifiers of the bridge.

2. The invention in accordance with claim 1 wherein said timing means includes transformer means connected to the input of said bridge and circuit means connected to the transformer for providing said output signal having a magnitude proportional to the commutation time.

3. The invention in accordance with claim 2 further including means responsive to the output of said transformer to produce pulses having a width proportional in time to the period during which no commutation is taking place.

4. The invention in accordance with claim 1 wherein said reference signal is a d.c. voltage of a prescribed level.

5. The invention in accordance with claim 1 wherein said reference is a d.c. voltage of a prescribed level and wherein said timing means includes transformer means connected to the input of said bridge and further including means responsive to the output of said transformer to produce the pulses having a width proportional to the time period during which no commutation is taking place.

6. A power conversion system for furnishing power to a direct current load from an alternating current source comprising:
   (a) a rectifying bridge having at least one controlled rectifier associated with each phase of the source;
   (b) means for supplying gating signals to each of said controlled rectifiers, said gating signals serving to govern the initiation of conduction of said rectifiers; and,
   (c) means for preventing the commutation failure of the controlled rectifiers of said bridge comprising,
      (1) timing means for determining the time periods during which commutation of each of said rectifiers occurs and to provide an output signal representative thereof,
      (2) means to provide a reference signal representing a predetermined value to which phasing back of said control rectifiers is limited,
      (3) means to combine said output signal and said reference signal to provide an overriding control signal; and,
      (4) means selectively responsive to said overriding control signal to advance the firing angle of the rectifiers of the bridge.

7. The invention in accordance with claim 6 wherein said timing means includes transformer means connected to the input of said bridge and circuit means connected to the transformer for providing an output signal having a magnitude proportional to the commutation time.

8. The invention in accordance with claim 7 further including means responsive to the output of said transformer to produce pulses having a width proportional in time to the period during which no commutation is taking place.

9. The invention in accordance with claim 6 wherein said reference signal is a d.c. voltage of a prescribed level.

10. The invention in accordance with claim 6 wherein said reference is a d.c. voltage of a prescribed level and wherein said timing means includes transformer means connected to the input of said bridge and further including means responsive to the output of said transformer to produce the pulses having a width proportional to the time period during which no commutation is taking place.

11. The invention in accordance with claim 6 wherein said last recited means includes a high value gate for selectively passing, as a control signal to said means for supplying gating signals, a signal representing either a normal control signal indicative of a desired level of system operation or said overriding control signal.

* * * * *